(12) United States Patent
Mencher et al.

(10) Patent No.: US 6,832,975 B2
(45) Date of Patent: Dec. 21, 2004

(54) METHOD FOR CONTROLLING AN INTERNAL COMBUSTION ENGINE

(75) Inventors: Bernard Mencher, Schwieberdingen (DE); Klaus Ries-Mueller, Bad Rappenau (DE); Joachim Luh, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/387,704

(22) Filed: Mar. 13, 2003

(65) Prior Publication Data

US 2004/0018912 A1 Jan. 29, 2004

(30) Foreign Application Priority Data

Mar. 16, 2002 (DE) .......................... 102 11 695
Oct. 4, 2002 (DE) .......................... 102 46 421

(51) Int. Cl.⁷ ............................................ B60K 41/12
(52) U.S. Cl. ...................................................... 477/47
(58) Field of Search ........................................... 477/47

(56) References Cited

U.S. PATENT DOCUMENTS 4,665,775 A * 5/1987 Nagamatsu et al. .......... 477/47
4,784,021 A * 11/1988 Morimoto ..................... 477/40
5,007,147 A * 4/1991 Imai et al. ..................... 477/43
5,951,438 A * 9/1999 Adachi et al. ................ 477/47

FOREIGN PATENT DOCUMENTS

EP 0 451 887 A1 4/1990

* cited by examiner

*Primary Examiner*—Dirk Wright
(74) *Attorney, Agent, or Firm*—Baker & Daniels

(57) ABSTRACT

The invention concerns a method and a drive arrangement for controlling an internal combustion engine, said internal combustion engine acting via a variable transmission, particularly a continuously variable transmission, on drivable wheels or the like of a motor vehicle, in which a fuel feed to the internal combustion engine is at least reduced in dependence on an operating state and the internal combustion engine operates in overrun mode and a gear ratio of the transmission is adjusted, independently of driver intention, in dependence on at last one operating parameter of the motor vehicle.

It is provided that during overrun operation of the internal combustion engine (12), the gear ratio is controlled in such a way as to maximize the time interval for which the internal combustion engine (12) operates in the overrun operating state.

18 Claims, 2 Drawing Sheets

METHOD FOR CONTROLLING AN INTERNAL COMBUSTION ENGINE

The invention concerns a method for controlling an internal combustion engine, said internal combustion engine acting via a variable transmission, particularly a continuously variable transmission, on drivable wheels or the like of a motor vehicle, together with a drive arrangement, particularly for a motor vehicle, comprising an internal combustion engine operatively connected via a variable transmission, particularly a continuously variable transmission, to drivable wheels or the like.

PRIOR ART

Known from EP 0 451 887 B1, for example, is an electronically controlled continuously variable transmission whose gear ratio can be varied by means of an open-loop electronic controller. The gear ratio is adjusted in dependence on driver intention, which can be detected, for example, from the instantaneous position of the accelerator pedal. The gear ratio of the transmission can be adjusted with a view toward driving performance and/or fuel economy.

It is further known to control internal combustion engines via electronic controllers; torque-influencing variables of the internal combustion engine can be controlled in this case. This approach includes the control of a fuel injection system. It is known to at least reduce or, where appropriate, completely suspend fuel injection in order to reduce pollutant emissions and fuel consumption. The internal combustion engine then operates in what is known as overrun mode.

ADVANTAGES OF THE INVENTION

The present invention comprises, in one form thereof, a method for controlling an internal combustion engine which acts via a variable transmission, particularly a continuously variable transmission, on drivable wheels or the like of a motor vehicle, a fuel feed to the internal combustion engine being at least reduced in dependence on an operating state and the internal combustion engine operating in overrun mode and a gear ratio of the transmission being adjusted independently of driver intention in dependence on at least one operating parameter of the motor vehicle wherein during the overrun operation of the internal combustion engine (12), the gear ratio is controlled in such a way as to maximize the time interval for which the internal combustion engine (12) operates in the overrun operating state. The present invention comprises, in another form thereof, a drive arrangement particularly for a motor vehicle which includes an internal combustion engine that is operatively connected via a variable transmission, particularly a continuously variable transmission, to drivable wheels (22) or the like, and means via which a gear ratio of the transmission (16) is controlled in such a way that an overrun operating state of the internal combustion engine (12) can be made to last for a maximal time interval. These two forms of the invention offer the advantage that additional fuel economization and additional reduction of pollutant emissions can be achieved through engine control. Controlling the gear ratio during overrun operation of the internal combustion engine in such a way as to maximize the time interval for which the engine operates in the overrun operating state advantageously makes it feasible to affect the duration of overrun operation of the internal combustion engine via the transmission control system. In particular, if the starting rotation speed (the crankshaft rotation speed) of the internal combustion engine, that is, the crankshaft of the internal combustion engine, is adjusted via the gear ratio in such a way that the engine control system recognizes that the engine is in the overrun operating state, the engine control system can postpone the resumption of fuel injection to a later time if this accords with instantaneous driver intention. This prolongs the engine's overrun cutoff phase, resulting in reduced fuel demand and thus reduced pollutant emissions because of this prolongation.

In a preferred embodiment of the invention, it is provided that the gear ratio is controlled in such a way that the crankshaft rotation speed of the engine is above a presettable threshold value that preferably corresponds to the current resumption rotation speed for fuel injection to the engine. Thus, advantageously, the input rotation speed (primary rotation speed) of the transmission and consequently the crankshaft rotation speed of the engine can be regulated to a given, selectable rotation speed value by simple control of the continuously variable transmission. In this way, depending on the instantaneous torque demand on the engine, which corresponds to driver intention, the crankshaft rotation speed of the engine can be kept above the resumption rotation speed for a maximum possible time interval via control of the transmission. This extends the operation of the engine in the overrun operating state to the maximum possible time interval, thus making it possible to maximize the fuel savings and the reduction of pollutant emissions that are associated with overrun operation of the engine.

In addition, the drive arrangement of the invention may include an internal combustion engine having output rotation speed that is increased to no more than the resumption rotation speed plus a presettable offset when in an overrun operating state thereby offering the advantage of enabling the prolongation of the overrun cutoff phase of the engine to be implemented in motor vehicles in a simple manner. Providing means for controlling a gear ratio of the transmission in such a way that an overrun operating state of the engine can be made to last for a maximum possible time interval advantageously makes it feasible to affect the overrun cutoff phase of the engine through simple transmission control means. In a preferred embodiment of the invention, these control means can be integrated into an electronic transmission controller.

Further preferred embodiments of the invention will become apparent from the other features recited in the dependent claims.

DRAWINGS

The invention will now be described in more detail in the form of an exemplary embodiment with reference to the appended drawings, wherein.

DESCRIPTION OF THE EXEMPLARY EMBODIMENT

Figure 1:
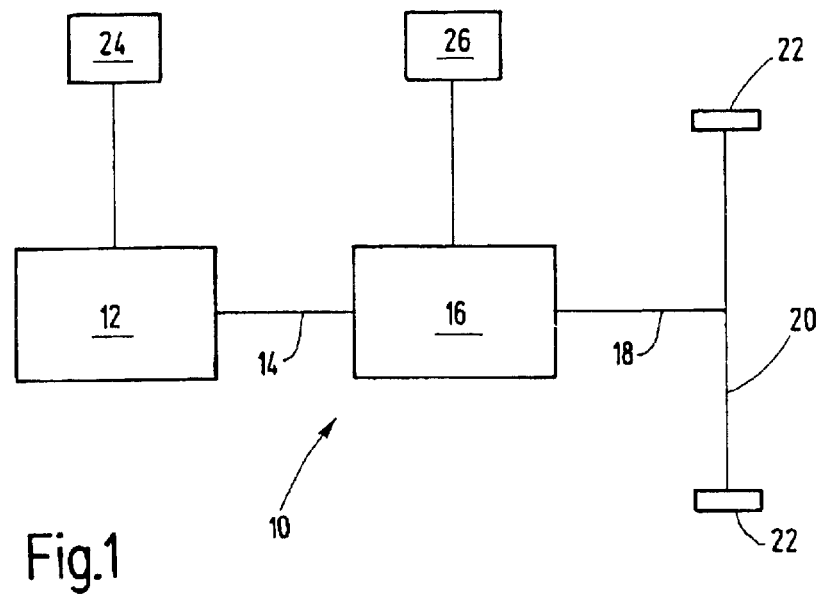
FIG. 1 is a schematic diagram of a drive arrangement of a motor vehicle.

FIG. 1 schematically illustrates a drive arrangement 10 for a motor vehicle. Drive arrangement 10 comprises an internal combustion engine 12 whose crankshaft 14 is connected to a continuously variable transmission 16. Crankshaft 14 is therefore the input shaft of transmission 16. An output shaft 18 of transmission 16 is operatively connected to a drive axle 20, which in turn bears drivable wheels 22. Assigned to internal combustion engine 12 is an engine controller 24, and assigned to transmission 16 is a transmission controller 26. Engine controller 24 and transmission controller 26 can be physically separate devices, although in a further exemplary embodiment they can also be integrated into a common controller. Clutches, intermediate gears and the like can be arranged between internal combustion engine 12 and transmission 16 and between transmission 16 and drive axle 20.

The construction and manner of operation of such a drive arrangement 10 are widely known and consequently will not be examined more closely in this description. In general, it should be noted in addition that torque-influencing variables of the internal combustion engine 12 are controlled by means of engine controller 24. These variables include, for example, ignition control and fuel feed. Transmission controller 26 can be used to adjust the ratio of input rotation speed, i.e. the rotation speed of crankshaft 14 in this case, to output rotation speed, i.e. output shaft 18 in this case, in an infinitely variable and continuous manner.

Figures 2, 3:
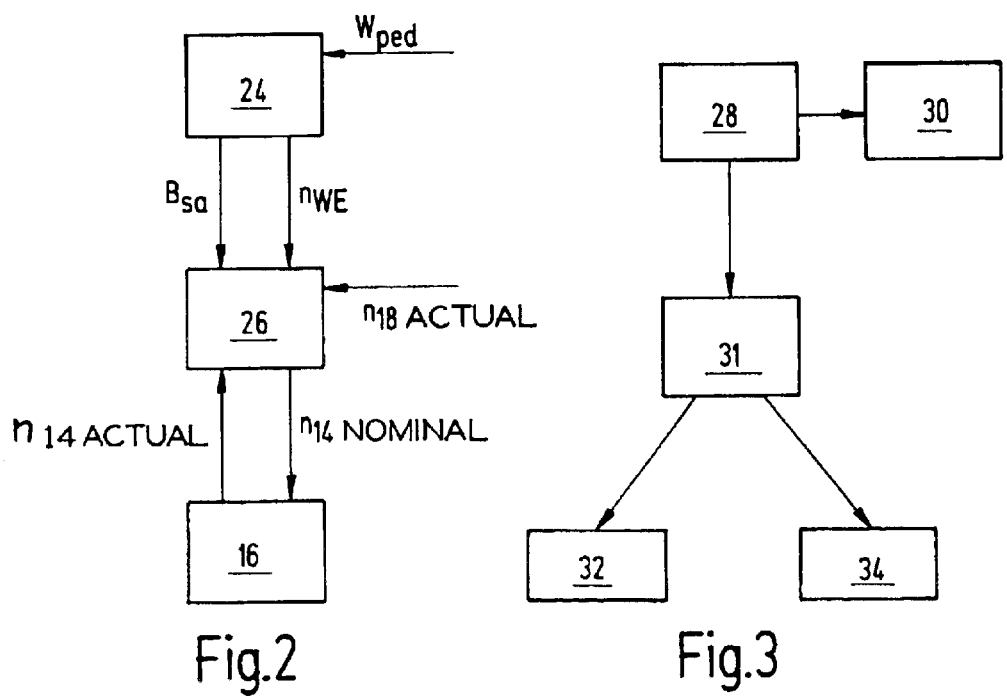
FIG. 2 is a block diagram of the method of the invention.
FIGS. 3 and 4 show characteristic curves of the overrun cutoff function of the internal combustion engine according to the prior art and according to the method of the invention.

FIG. 2 is a block diagram of components of the drive arrangement 10 according to the invention. Engine controller 24 is connected to transmission controller 26 for purposes of data communication. This connection can be made, for example, via a bus, for example a CAN [controller area network] bus. Transmission controller 26 is connected in turn to final controlling means of the transmission 16, the gear ratio of transmission 16 being able to be varied infinitely and continuously via appropriate drive signals. Transmission 16 is a so-called belt transmission, for example.

Engine controller 24 receives, inter alia, a signal $W_{ped}$ that corresponds to the accelerator-pedal angle, i.e., the position of an accelerator pedal. The signal therefore corresponds to instantaneous driver intention, based on a torque demand on drive arrangement 10. The engine controller receives, inter alia, a signal $B_{ped}$ that indicates whether the accelerator pedal is being actuated. If the accelerator pedal is not being actuated, signal $B_{ped}=1$. Engine controller 24 delivers to transmission controller 26 a signal $n_{we}$ that corresponds to the current resumption rotation speed of crankshaft 14, below which the rotation speed must not fall during an overrun cutoff phase. If the rotation speed falls below the resumption rotation speed $n_{we}$, the fuel injection that was reduced or stopped during an overrun cutoff phase is resumed via engine controller 24, i.e., internal combustion engine 12 recommences combustion. Transmission controller 26 further receives from engine controller 24 a signal $B_{sa}$, which, as a logic signal, indicates overrun cutoff "on" ($B_{sa}=1$) or overrun cutoff "off" ($B_{sa}=0$).

Transmission controller 26 receives from transmission 16 a signal $n_{14actual}$ that corresponds to the instantaneous actual rotation speed of crankshaft 14. Transmission controller 26 delivers to transmission 16 a signal $n_{14nominal}$ that corresponds to the nominal rotation speed of crankshaft 14 in overrun mode, i.e., when signal $B_{sa}=1$. Transmission controller 26 further receives another signal $n_{14actual}$ that corresponds to the rotation speed of transmission output shaft 18.

Engine controller 24, transmission controller 26 and transmission 16 obviously receive and output still other signals which need not be considered further in this description.

FIG. 3 illustrates the method of the invention in a flow chart. In a step 28, it is first ascertained whether the conditions are met for overrun cutoff by the internal combustion engine 12, for example by reduction or stoppage of the fuel feed. This is accomplished, for example, by determining whether signal $B_{ped}$ equals 1 and is smaller than $n_{sa}$ and whether rotation speed $n_{14actual}$ is greater than rotation speed $n_{we}$. If these conditions are not present, abortion 30 of the method occurs.

If the conditions are present, in a step 31 a check is performed to determine whether crankshaft rotation speed $n_{14actual}$ has fallen below resumption rotation speed $n_{we}$. If $n_{14actual} < n_{we}$, crankshaft rotation speed $n_{14}$ is increased in a step 32 until crankshaft rotation speed $n_{14nominal}=$ resumption rotation speed $n_{we}$. A presettable offset can be taken into account in this process, that is, rotation speed $n_{14nominal}$ is increased to a rotation speed $n_{we}+$the offset rotation speed. This increase in rotation speed in step 32 can, for example, be in an amount of 100 to 200 rpm. In this connection, a preset limit value can be specified to represent the maximum by which the rotation speed can be increased over the resumption rotation speed $n_{we}$. Otherwise, the increase in rotation speed would become negatively apparent to the driver as a braking effect on the vehicle. It can also be provided that to compensate for this braking action the engine control system is also influenced, for example by the slight opening of a throttle valve in the air intake system of the internal combustion engine 12.

If it is determined in step 31 that crankshaft rotation speed $n_{14actual} \geq$ resumption rotation speed $n_{we}$, in step 34 a control is performed on transmission 16 via transmission controller 26 such that rotation speed $n_{14actual}$ remains above resumption rotation speed $n_{we}$, i.e., is not allowed to fall below resumption rotation speed $n_{we}$.

It will be appreciated that both in the variant of step 32 and in the variant of step 34, the crankshaft rotation speed $n_{14}$ is kept above resumption rotation speed $n_{we}$ by controlling transmission 16 via transmission controller 26. This delays the instant of resumption of fuel injection to internal combustion engine 12, thus prolonging the overrun cutoff phase of internal combustion engine 12. In a vehicle with an automatic transmission, for example, this prolongation can range from 14 s to 38 s, assuming defined, identical external conditions. Clearly, a considerable prolongation of the overrun cutoff phase can be achieved under these circumstances. The accompanying fuel economization for the internal combustion engine can therefore amount to roughly 1% of overall fuel consumption.

Figure 4:
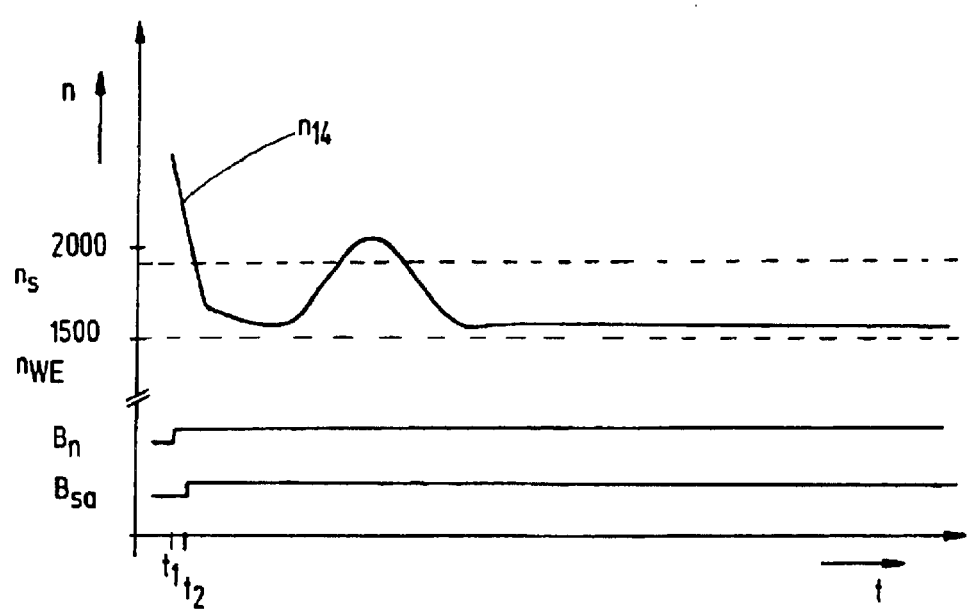

FIG. 4 shows a characteristic curve of crankshaft rotation speed $n_{14nominal}$ over time t. The resumption rotation speed $n_{we}$ is here assumed to be 1500 rpm. As is apparent, at instant $t_1$[1] the accelerator-pedal signal $B_{ped}$ jumps from its logic value 0 to its logic value 1. This occurs when accelerator-pedal angle signal $W_{ped}=0$ or falls below a minimum threshold. That means that no torque demand is being placed on the internal combustion engine 12 by the driver of the vehicle at that time.

[1]Translator's Note: There is a spot on this copy that looks as if there could be a—sign before the $t_1$. However, we feel it should just be $t_1$ so please verify on an original.

If accelerator-pedal signal $B_{ped}$ assumes the logic value 1, this is followed at a subsequent instant $t_2$ by enabling of the overrun operating state for internal combustion engine 12, i.e., signal $B_{sa}$ assumes the logic value 1. Time interval $t_1$ to $t_2$ is used to establish with certainty that there is in fact no torque demand on the internal combustion engine 12 for the duration of a presettable time interval. In addition, the rotation speed must be below a presettable threshold $n_{sa}$. Crankshaft rotation speed $n_{14}$ decreases over time due to the lack of torque demand on the internal combustion engine 12 and is pulled out of its decline by the method of the invention above resumption rotation speed $n_{we}$, i.e. 1500 rpm in this case. This means that at instant $t_2$ transmission controller 26 is activated to control transmission 16, so that crankshaft rotation speed $n_{14}$ assumes the nominal rotation speed $n_{14nominal}$. There follows a brief rise in crankshaft rotation speed $n_{14}$, with internal combustion engine 12 in overrun mode, until this crankshaft rotation speed $n_{14}$ is maintained above resumption rotation speed $n_{we}$. Also specified is an upper threshold $n_s$ that is equal to the resumption rotation speed $n_{we}$+a hysteresis (the difference between resumption rotation speed $n_{we}$ and upper threshold $n_s$). The hysteresis establishes the maximum rotation speed to which crankshaft rotation speed $n_{14}$ can be increased during the overrun cutoff phase without any negative impact on the driving behavior of the motor vehicle, and thus on the driving feel experienced by the driver.

What is claimed is:

1. A method of controlling an internal combustion engine, the method comprising:
   providing a motor vehicle having a continuously variable transmission defining a gear ratio and operably disposed between the internal combustion engine and at least one driveable wheel, the engine having a first operating state and an overrun operating state, a user-operated accelerator operably coupled to the engine;
   reducing the fuel feed to the engine when operating the engine in the overrun operating state relative to the fuel feed to the engine when operating the engine in the first operating state; and
   adjusting the gear ratio of the transmission as a function of at least one operating parameter of the motor vehicle and independently of the accelerator when the engine is in the overrun operating state and wherein the gear ratio is adjusted to prolong the time interval of the overrun operating state.

2. The method of claim 1 wherein the internal combustion engine has a crankshaft and the method further includes detecting at least one variable representative of the rotational speed of the crankshaft to determine when the engine is in the overrun operating state.

3. The method of claim 2 wherein adjustment of the gear ratio of the transmission to prolong the time interval of the overrun operating state includes adjusting the gear ratio to maintain the rotational speed of the crankshaft above a preselected threshold value when the engine is in the overrun operating state.

4. The method of claim 3 wherein the overrun operating state of the engine is terminated and the fuel feed to the engine is increased when the rotational speed of the crankshaft falls below a resumption rotational speed and the preselected threshold value is set to a value substantially equivalent to the resumption rotational speed of the crankshaft.

5. The method of claim 1 wherein the internal combustion engine has a crankshaft and the overrun operating state of the engine is terminated and the fuel feed to the engine is increased when the rotational speed of the crankcase falls below a resumption rotational speed and wherein a transmission control system adjusts the gear ratio of the transmission to maintain the rotational speed of the crankshaft above the resumption rotational speed.

6. The method of claim 5 wherein adjustment of the gear ratio of the transmission to prolong the time interval of the overrun operating state includes increasing the rotational speed of the crankshaft to a rotational speed that is no more than the resumption rotational speed plus a preselected offset rotational speed value.

7. The method of claim 5 wherein the motor vehicle includes an engine control system and the engine control system adjusts the operation of the engine, when the engine is in the overrun operating state, to compensate for a braking effect caused by an increase in the rotational speed of the crankshaft resulting from a change in the gear ratio of the transmission.

8. The method of claim 6 wherein the motor vehicle includes an engine control system and the engine control system adjusts the operation of the engine, when the engine is in the overrun operating state, to compensate for a braking effect caused by an increase in the rotational speed of the crankshaft resulting from a change in the gear ratio of the transmission.

9. The method of claim 1 wherein engine includes a crankshaft and the motor vehicle includes an engine control system wherein the engine control system adjusts the operation of the engine, when the engine is in the overrun operating state, to compensate for a braking effect caused by an increase in the rotational speed of the crankshaft resulting from a change in the gear ratio of the transmission.

10. The method of claim 7 wherein the engine control system adjusts the operation of the engine to compensate for a braking effect by opening a throttle valve in an air intake system of the engine.

11. The method of claim 8 wherein the engine control system adjusts the operation of the engine to compensate for a braking effect by opening a throttle valve in an air intake system of the engine.

12. The method of claim 9 wherein the engine control system adjusts the operation of the engine to compensate for a braking effect by opening a throttle valve in an air intake system of the engine.

13. A drive arrangement for a motor vehicle, the drive arrangement comprising:
   an internal combustion engine having a first operating state and an overrun operating state wherein a fuel feed to the engine is reduced during the overrun operating state relative to the first operating state;
   at least one drivable wheel;
   a continuously variable transmission defining a gear ratio operably disposed between the engine and the drivable wheel; and
   means for controlling the drive arrangement wherein the means adjusts the gear ratio of the transmission to prolong the duration of the overrun operating state of the engine.

14. The drive arrangement of claim 13 wherein the means for controlling the drive arrangement comprises a controller operably coupled to the transmission.

15. The drive arrangement of claim 13 wherein the internal combustion engine includes a crankshaft and the overrun operating state of the engine is terminated and the fuel feed to the engine is increased when the rotational speed of the crankshaft falls below a resumption rotational speed and wherein the means for controlling the drive arrangement adjusts the gear ratio of the transmission, during the overrun operating state, to maintain the rotational speed of the crankshaft above the resumption rotational speed.

16. The drive arrangement of claim 15 wherein the means for controlling the drive arrangement adjusts the gear ratio of the transmission, during the overrun operating state, to increase the rotational speed of the crankshaft to a rotational speed that is no more than the resumption rotational speed plus a preselected offset rotational speed value.

17. The drive arrangement of claim 15 further including an engine control system, the engine control system adjusting the operation of the engine, when the engine is in the overrun operating state, to compensate for a braking effect caused by an increase in the rotational speed of the crankshaft resulting from a change in the gear ratio of the transmission.

18. The drive arrangement of claim 17 wherein the engine control system adjusts the operation of the engine to compensate for a braking effect by opening a throttle valve in an air intake system of the engine.

* * * * *

UNITED STATES PATENT AND TRADEMARK OFFICE
CERTIFICATE OF CORRECTION

PATENT NO. : 6,832,975 B2
DATED : December 21, 2004
INVENTOR(S) : Bernhard Mencher et al.

It is certified that error appears in the above-identified patent and that said Letters Patent is hereby corrected as shown below:

Title page,
Item [75], Inventors, correct the spelling of the first inventor's name to -- Bernhard Mencher --
Item [57], ABSTRACT,
Line 10, change "last" to -- least --

Column 5,
Line 51, change "crankcase" to -- crankshaft --

Signed and Sealed this

Twenty-sixth Day of April, 2005

JON W. DUDAS
*Director of the United States Patent and Trademark Office*